(12) United States Patent
Thompson

(10) Patent No.: US 7,566,177 B2
(45) Date of Patent: Jul. 28, 2009

(54) IMAGING DEVICE ASSEMBLY

(75) Inventor: Robert Lee Thompson, Rogers, AR (US)

(73) Assignee: Pinotage L.L.C., Fayetteville, AR (US)

( * ) Notice: Subject to any disclaimer, the term of this patent is extended or adjusted under 35 U.S.C. 154(b) by 423 days.

(21) Appl. No.: 11/386,371

(22) Filed: Mar. 22, 2006

(65) Prior Publication Data

US 2006/0216019 A1    Sep. 28, 2006

Related U.S. Application Data

(60) Provisional application No. 60/663,969, filed on Mar. 22, 2005.

(51) Int. Cl.
*G03B 17/00* (2006.01)
(52) U.S. Cl. ........................ 396/427; 396/542
(58) Field of Classification Search .............. 396/25, 396/27, 427, 428, 542; 348/81, 373–376
See application file for complete search history.

(56) References Cited

U.S. PATENT DOCUMENTS

| | | | |
|---|---|---|---|
| 2,855,826 A * | 10/1958 | Jayet | 359/892 |
| 4,281,909 A | 8/1981 | Ishibashi et al. | |
| 4,473,177 A * | 9/1984 | Parandes | 224/191 |
| 4,604,668 A | 8/1986 | Lemelson | |
| 5,350,033 A | 9/1994 | Kraft | |
| 6,402,031 B1 | 6/2002 | Hall | |
| 6,424,804 B1 | 7/2002 | Johnson et al. | |
| 6,476,853 B1 | 11/2002 | Zernov et al. | |
| 6,674,476 B1 * | 1/2004 | Suzuki | 348/375 |
| 6,805,498 B2 * | 10/2004 | Ford | 396/427 |
| 6,830,387 B2 * | 12/2004 | Rife | 396/427 |
| 7,182,529 B2 * | 2/2007 | Kurosawa | 396/358 |
| 2002/0024450 A1 | 2/2002 | Townsend et al. | |
| 2003/0053806 A1 * | 3/2003 | Schneider | 396/427 |
| 2004/0081884 A1 | 4/2004 | Bean et al. | |

FOREIGN PATENT DOCUMENTS

JP    03015207    1/2003

OTHER PUBLICATIONS

Invitation to Pay additional fees in correspoding International Application No. PCT/US2006/00325, Sep. 7, 2006.
International Search Report & Written Opinion in corresponding International Application No. PCT/US2006/010325 dated Nov. 10, 2006.
Military Specification, Shock Tests High Impact Shipboard Machinery, Equipment, and Systems, Navy Mar. 17, 1989.

* cited by examiner

*Primary Examiner*—W. B. Perkey
(74) *Attorney, Agent, or Firm*—Wolf, Greenfield & Sacks, P.C.

(57) ABSTRACT

An assembly for mounting an imaging device, such as a camera, is provided. The assembly may include a housing and an imaging device mounted to the housing. The housing is constructed and arranged in a manner that absorbs and/or dampens a shock and/or vibration to minimize any resulting damage to the imaging device. The assembly may be constructed and arranged to meet MIL-S-901D (NAVY). In one embodiment, resilient and/or robust materials are incorporated into the mounting assembly.

26 Claims, 13 Drawing Sheets

1. Test Data PT2006 P/T External Camera

| Impact Plane | | Video Before | Video After | Stopped Test | Remarks |
|---|---|---|---|---|---|
| Top-1 | 1 | Great | Great | | No loss of video signal before, during or after hammer drop. Pan and tilt operation functions properly. |
| Top-2 | 2 | Great | Great | | Tightened the 10x32 screws and added nuts to hold the camera body tight against the mounting plate, mounting issue not a camera problem. No loss of video signal before, during or after hammer drop. Pan and tilt operaton functions properly. |
| Top-3 | 3 | Great | Great | | No loss of video signal before, during or after hammer drop. Pan and tilt operation functions properly. |
| Side-1 | 7 | Great | Great | | No loss of video signal before, during or after hammer drop. Pan and tilt operation functions properly. |
| Side-2 | 8 | Great | Great | | No loss of video signal before, during or after hammer drop. Pan and tilt operation functions properly. |
| Side-3 | 9 | Great | Great | | No loss of video signal before, during or after hammer drop. Pan and tilt operation functions properly. |
| Back-1 | 4 | Great | Great | | No loss of video signal before, during or after hammer drop. Pan and tilt operation functions properly. |
| Back-2 | 5 | Great | Great | | No loss of video signal before, during or after hammer drop. Pan and tilt operation functions properly. |
| Back-3 | 6 | Great | Great | | No loss of video signal before, during or after hammer drop. Pan and tilt operation functions properly. |

FIG. 10a

2. Test Data BX4004-404 Internal Box Camera, Wide Angle

| Impact Plane | | Video Before | Video After | Stopped Test | Remarks |
|---|---|---|---|---|---|
| Top-1 | 1 | Great | Great | | No loss of video signal before, during or after hammer drop. |
| Top-2 | 2 | Great | Great | | No loss of video signal before, during or after hammer drop. |
| Top-3 | 3 | Great | Great | | No loss of video signal before, during or after hammer drop. |
| Side-1 | 7 | Great | Great | | No loss of video signal before, during or after hammer drop. |
| Side-2 | 8 | Great | Great | | No loss of video signal before, during or after hammer drop. |
| Side-3 | 9 | Great | Great | | No loss of video signal before, during or after hammer drop. |
| Back-1 | 4 | Great | Great | | No loss of video signal before, during or after hammer drop. |
| Back-2 | 5 | Great | Great | | No loss of video signal before, during or after hammer drop. |
| Back-3 | 6 | Great | Great | | No loss of video signal before, during or after hammer drop. |

FIG. 10b

3. Test Data BX4004-10x40 Internal Box Camera,

| Impact Plane | | Video Before | Video After | Stopped Test | Remarks |
|---|---|---|---|---|---|
| Top-1 | 1 | Great | Great | | No loss of video signal before, during or after hammer drop. |
| Top-2 | 2 | Great | Great | | No loss of video signal before, during or after hammer drop. |
| Top-3 | 3 | Great | Great | | No loss of video signal before, during or after hammer drop. |
| Side-1 | 7 | Great | Great | | No loss of video signal before, during or after hammer drop. |
| Side-2 | 8 | Great | Great | | No loss of video signal before, during or after hammer drop. |
| Side-3 | 9 | Great | Great | | No loss of video signal before, during or after hammer drop. |
| Back-1 | 4 | Great | Great | | No loss of video signal before, during or after hammer drop. |
| Back-2 | 5 | Great | Great | | No loss of video signal before, during or after hammer drop. |
| Back-3 | 6 | Great | Great | | No loss of video signal before, during or after hammer drop. |

*FIG. 10c*

IMAGING DEVICE ASSEMBLY

RELATED APPLICATIONS

This application claims priority under 35 U.S.C. § 119(e) to U.S. Provisional Application Ser. No. 60/663,969, entitled "CAMERA ASSEMBLY" filed on Mar. 22, 2005, which is herein incorporated by reference in its entirety.

FIELD

Aspects of the present invention relate generally to an assembly for mounting an imaging device, and more particularly to an imaging device assembly capable of withstanding certain impacts and shock loadings.

DISCUSSION OF RELATED ART

Various types of imaging devices, such as cameras, and imaging device assemblies exist. However, no such assembly is known to the present inventors to be capable of withstanding certain shock and vibration tests, such as the military specification MIL-S-901D (NAVY), described in further detail below. When subjected to the military standard, including the shock or vibration loadings, components of the prior art imaging devices and/or the prior art imaging device mounting assemblies would be prone to deform or break, leading to likely operational degradation. Therefore, utilizing such prior art devices in hostile environments, or merely deploying such devices in hostile environments which subject the device to shock or vibration loadings, was limited.

SUMMARY

In one embodiment, an imaging device mounting assembly is provided. The mounting assembly includes an outer housing, and a sub-assembly for securing an imaging device thereto, where the sub-assembly is enclosed within the outer housing. The imaging device mounting assembly is constructed and arranged to meet MIL-S-901D (NAVY).

In another embodiment, an assembly for mounting an imaging device is provided. The assembly includes an imaging device mounting board for securing the imaging device thereto, an outer housing enclosing the imaging device mounting board, where the imaging device mounting board is secured to the outer housing, and a resilient material interfaced between the outer housing and at least one of the imaging device and the mounting board. The resilient material is arranged with respect to the outer housing and at least one of the imaging device and the mounting board in a manner that at least partially dampens movement to minimize any resulting damage to the imaging device.

In yet another embodiment, an imaging device mounting assembly is provided. The mounting assembly includes an imaging device head sub-assembly which includes an outer housing, and a sub-assembly for securing an imaging device thereto, where the sub-assembly is enclosed within the outer housing. The mounting assembly also includes a cantilever arm sub-assembly rotatably connected to the imaging device head sub-assembly, and a base sub-assembly connected to the imaging device head sub-assembly. The cantilever arm sub-assembly is constructed and arranged to provide the imaging device with tilting capabilities, and the base sub-assembly is constructed and arranged to provide the imaging device with panning capabilities. The mounting assembly is sealed to be water resistant, such that the mounting assembly is submersible under up to 2 meters of water for a duration of time between at least 2 hours and up to 78 hours, without affecting the functionality of the imaging device within the outer housing.

In yet one more embodiment, an imaging device mounting assembly is provided. The imaging device mounting assembly includes an outer housing, an imaging device enclosed within the outer housing, and means for mounting the imaging device within the outer housing such that the mounting assembly is constructed and arranged to meet MIL-S-901D (NAVY).

BRIEF DESCRIPTION OF DRAWINGS

Various embodiments of the invention will now be described, by way of example, with reference to the accompanying drawings, in which:

FIGS. 10A-C illustrate copies of the Laboratory Services Shock Test Data in accordance with MIL-S-901D (NAVY) Lightweight specification.

DETAILED DESCRIPTION

Figure 1:
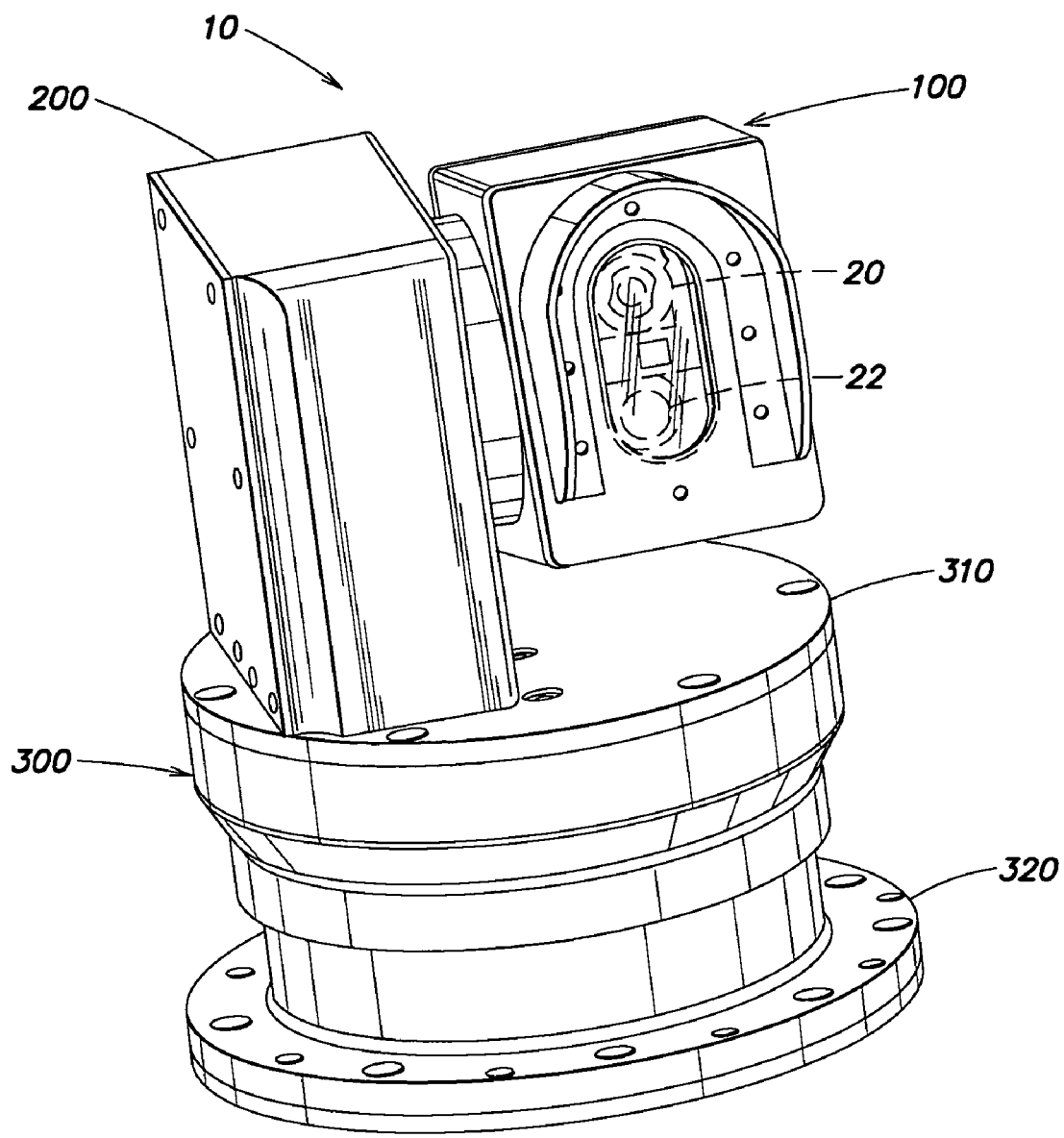
FIG. 1 is a perspective view of the imaging device mounting assembly according to one embodiment.

There are numerous circumstances where it would be desirable to mount an imaging device in a manner so as to withstand shock and vibration loadings and/or deploy the imaging device in a manner, or in an environment that is subjected to shock and vibration loadings, without harming the imaging device or rendering the imaging device inoperable. In particular, there are a variety of military applications, such as on planes, ships, drones, aircraft carriers, submarines, tanks, armament, as well as on other various vehicles or equipment, where a shock-resistant imaging device assembly would be desirable. Similarly, remote deployment of imaging devices in a hostile environment, by, for example, dropping the imaging device from a plane, may render a shock-resistant imaging device desirable.

However, as noted above, the inventors of the present invention know of no prior art imaging devices and/or imaging device mounting assemblies that are capable of withstanding these shock loadings. Depending on the severity of the shock, prior art imaging devices and imaging device mounting assemblies would likely either crack or break, rendering the device inoperable, or at least limiting the applications suitable for such devices. Aspects of the present invention are directed to overcoming these shortcomings.

According to one aspect of the invention, the imaging device mounting assembly is constructed in a manner enabling the imaging device assembly to pass the military standard for light duty shock testing. In particular, as described in further detail below, according to one aspect of the invention, the imaging device mounting assembly meets the MIL-S-901D (NAVY) specifications. A copy of this specification is included in U.S. Provisional Application No. 60/663,969, which is incorporated by reference in its entirety. In one embodiment, the imaging device mounting assembly meets the MIL-S-901D (NAVY) specifications for the Lightweight category, Grade A, Class I, Type A, for a Hull Mounting. Under this specific test, the equipment is considered to fail if, after the series of shocks, the equipment either fails to perform its principle function, or if any portion otherwise becomes adrift. Other suitable testing standards may also be applicable, as the present invention is not limited in this respect. Examples of such standards include, but are not limited to, MIL-S-901D (NAVY) specifications for the Medium weight category and MIL-S-901D (NAVY) specifications for the Heavyweight category. The present invention also contemplates other standards described in MIL-S-901D (NAVY), such as Grade B, Class II and III, and Type B and C.

Aspects of the invention are directed to a rugged assembly for mounting an imaging device, such as a camera. In one embodiment, the mounting assembly includes an energy absorbing material to dampen shock and/or vibration. In another embodiment, the imaging device mounting assembly is constructed of robust materials of sufficient size and structure to withstand impacts. Other embodiments employ a combination of both energy absorbing and robust structural materials.

Other aspects of the invention are directed to a field-deployable pod for an imaging device. Still other aspects of the invention are directed to a modular field deployable imaging device assembly.

The imaging device mounting assembly of the present invention may be used in a variety of applications. In one embodiment, the mounting assembly is used for naval applications, such as hull and bulkhead mounted imaging devices. Certain mounting assemblies may be designed for use on aircraft carriers, which may include 8-12 or more imaging device mounting assemblies.

As discussed in greater detail below, in some embodiments, the imaging device mounting assembly may include panning and/or tilting capabilities. In particular, tilting capabilities enable the adjustment of the position of an imaging device with respect to a horizontal axis. Similarly, panning capabilities enable an imaging device to rotate with respect to a vertical axis.

In some embodiments, the imaging device mounting assembly is constructed to be water resistant, and in some embodiments, may be submersible under a fluid, such as water, without affecting the functionality and operability of the imaging device. The inventors of the present invention know of no prior art pan and/or tilt imaging devices and/or imaging device mounting assemblies that are capable of being submersed, by itself, under water, (i.e. without placing the assembly in a separately sealed external housing or bubble). As described in greater detail below, in one embodiment, the imaging device mounting assembly may be constructed and arranged to seal an imaging device housed within the assembly. Various types of seals, for example, may be incorporated into the imaging device mounting assembly such that the imaging device is operable either while the mounting assembly is being submersed or after. As described below, in one embodiment, the imaging device mounting assembly is capable of being submerged under water up to a depth of approximately 2 meters for up to 2 hours. In another embodiment, the imaging device is capable of being submerged under water up to a depth of approximately 2 meters for up to 78 hours. For both embodiments, little or no water enters the functional areas of the imaging device such that the imaging device can remain operational.

The mounting assembly may be configured to hold a plurality of imaging devices. When the mounting assembly holds more than one imaging device, it may be configured so that a user can toggle back and forth between images with no lag time and no need to re-focus. In one embodiment, the assembly may hold two imaging devices within the housing, such as a night vision camera and a day vision camera. In another embodiment, the assembly may hold both a wide angle camera and a telephoto camera within the housing. In this embodiment, an imaging device with night vision capabilities may also be incorporated either into or adjacent the assembly. In other embodiments, when the mounting assembly holds a plurality of cameras, the camera my be sighted together such that both camera move in unison.

As discussed in more detail below, in one embodiment, the assembly is mounted to a portable wireless imaging system which may be used to remotely ascertain real time imaging. As noted above, in one embodiment, the mounting assembly has both panning and tilting capabilities to position the imaging device(s) in a variety of configurations. In one embodiment, the assembly is removably mounted to the portable system, thereby enabling a user to swap imaging device heads to configure the system as desired. For example, the system can include the above-noted assembly having a wide angle lens and a telephoto lens. Alternatively, this assembly may be removed and replaced with an assembly having night vision (Infrared) capabilities and day vision. Still other configurations may be employed, as the present invention is not limited in this respect.

Although the present invention is not limited for use with a particular type of imaging device, in one embodiment, the mounting assembly may be used with a camera, such as CCD (charge-coupled device) cameras. These cameras use a silicone chip whose surface is divided into light-sensitive pixels rather than a piece of film. CCD cameras may be desirable because they can create high-resolution images under a variety of light conditions. In other embodiments, the present invention may be used with other types of imaging devices including various video recording equipment.

Figure 2:
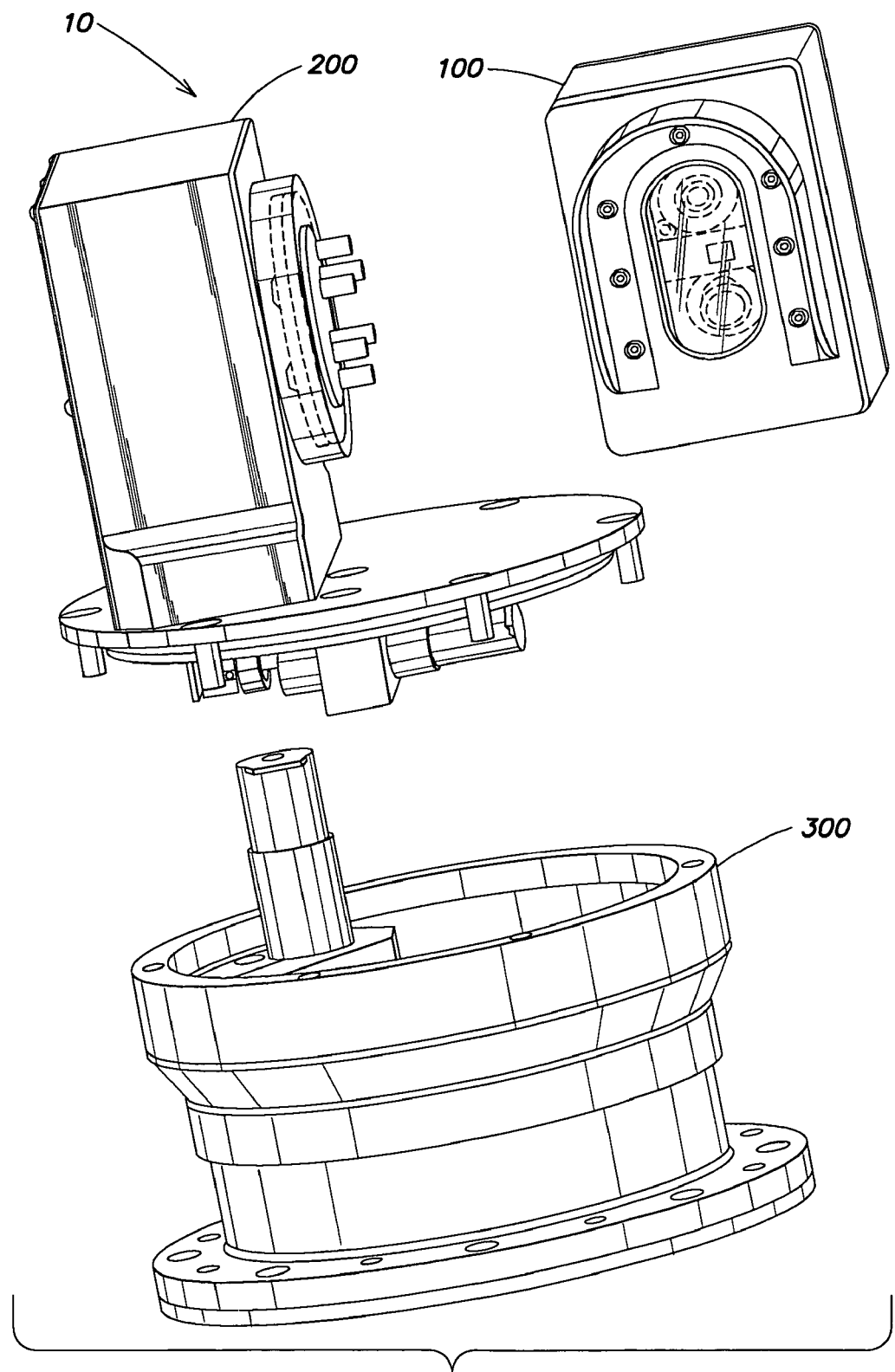
FIG. 2 is a perspective view of the subassemblies of an imaging device mounting assembly according to one embodiment.

Turning to the drawings, and in particular with reference to FIGS. 1-2, an imaging device mounting assembly 10 according to one embodiment of the invention is shown. The imaging device mounting assembly 10 includes an imaging device head sub-assembly 100, a cantilever arm sub-assembly 200, and a base sub-assembly 300. As illustrated, the imaging device head sub-assembly 100 houses the imaging device, such as cameras 20, 22. The imaging device head sub-assembly 100 may house one or more imaging devices; however in the embodiment described with reference to FIG. 1, two cameras 20, 22 are mounted within the assembly. As described in further detail below, the imaging device head sub-assembly 100 includes an outer housing 110 with a sub-assembly 122 for securing an imaging device within the housing 110.

The imaging device head sub-assembly 100 is rotatably connected to the cantilever arm sub-assembly 200. This enables a user to vary the tilt of an imaging device mounted in the assembly. In one embodiment, the cantilever arm sub-assembly 200 is adapted to tilt the imaging device head sub-assembly 100, scanning approximately 115°, ranging from 90° vertical to 25° below the horizontal with respect to the base sub-assembly. However, in other embodiments, the cantilever arm sub-assembly may be configured to tilt the imaging device at any range between −360° and 360°, and in other embodiments, the assembly may be configured to tilt the imaging device continuously, without having to return to a start or reset position, as the present invention is not limited in this respect. In one embodiment, slip rings are provided between the cantilever arm sub-assembly 200 and the imaging device head sub-assembly 100 and sliding contact of the slip rings allows for the continuous tilting of an imaging device.

As shown in FIG. 1, in one embodiment, the cantilever arm sub-assembly 200 connects to the base sub-assembly 300 so that an imaging device in the assembly is able to pan around for observation or recording purposes. The base sub-assembly 300 includes a rotating portion 310 and a stationary portion 320, where the rotating portion 310 moves with the cantilever arm and imaging device head sub-assemblies 200, 100, and the stationary portion 320 is either positioned adjacent to or secured to a support structure (not shown). In one embodiment, the base sub-assembly is adapted to pan the cantilever arm and imaging device head sub-assemblies between −360° and 360°, and in other embodiments, the assembly may be configured to tilt the imaging device continuously around the stationary portion 320 of the base assembly 300.

The above described panning and tilting capabilities enable the imaging device mounting assembly 10 to position an imaging device in a wide range of configurations. Depending upon the application, in some embodiments, the imaging device mounting assembly may only have panning capabilities, while in other embodiments, the imaging device mounting assembly may only have tilting capabilities. Further, there may be some applications where the imaging device mounting assembly does not have either panning or tilting capabilities, but rather is simply secured to a support structure. Furthermore, in one embodiment, the panning and/or tilting capabilities may track between about 0.01 degrees/second and up to about 60 degrees/second, depending on its particular application.

Figure 3:
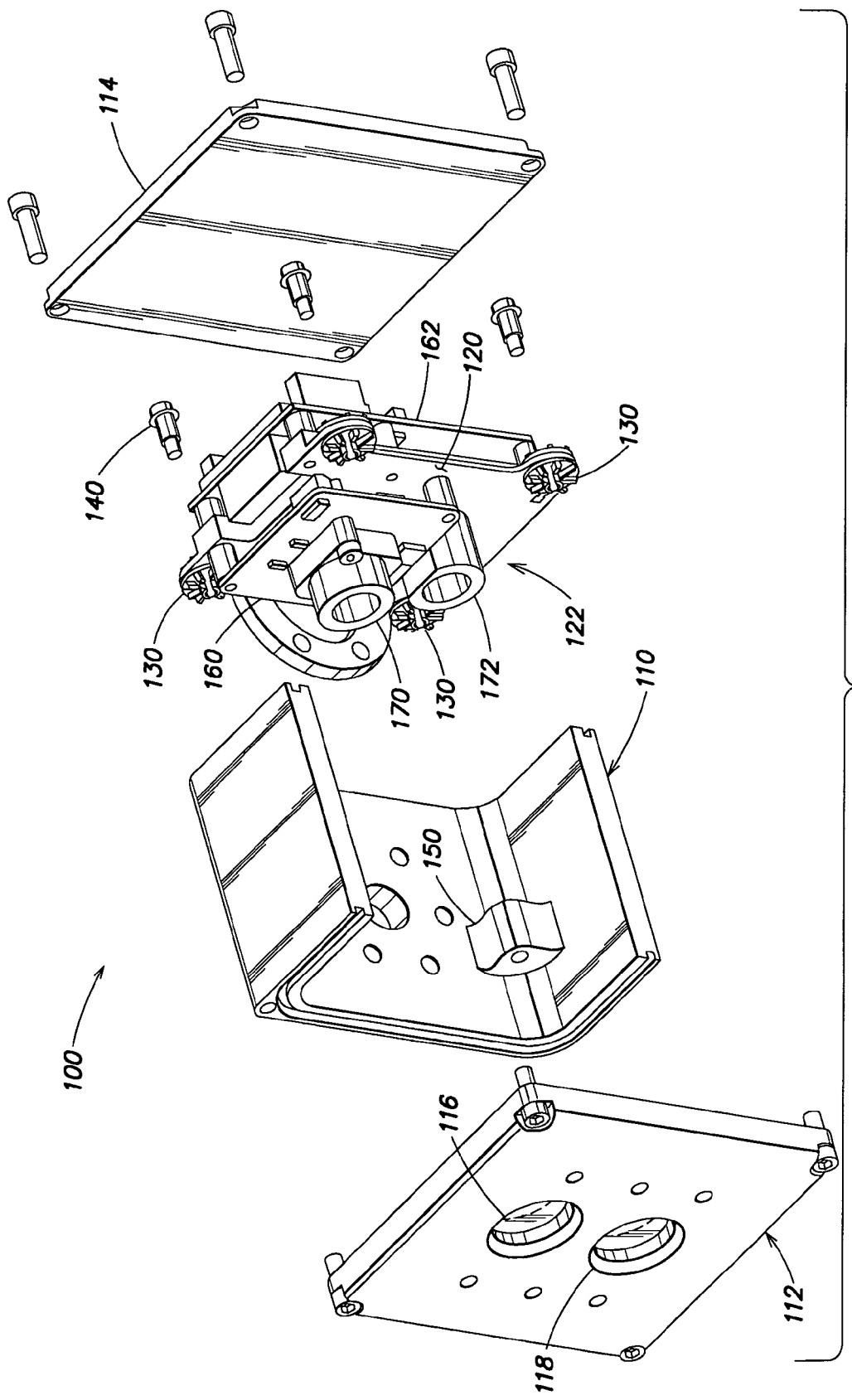
FIG. 3 is an exploded assembly view of part of the imaging device head sub-assembly according to one embodiment.
Figure 4:
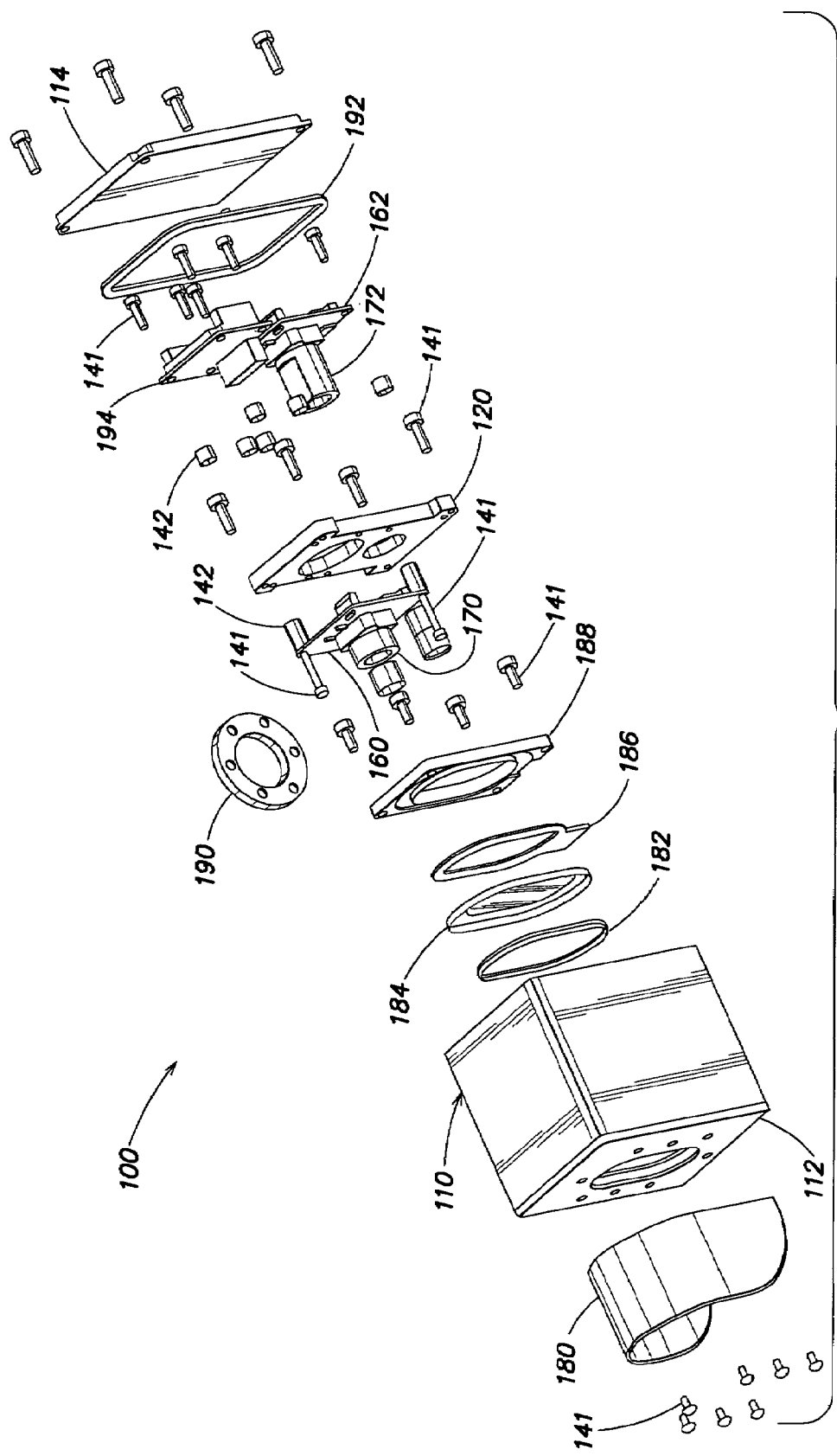
FIG. 4 is an exploded assembly view of the imaging device head sub-assembly according to one embodiment.

A portion of the imaging device head sub-assembly 100 is shown in greater detail in FIG. 3. An imaging device mounting board 120 is positioned within an imaging device housing 110 which is shown in a partially cut-out view in FIG. 3. At least one imaging device is secured to the imaging device mounting board 120 with the subassembly 122 for securing an imaging device within the housing. However, the embodiment of FIG. 3 illustrates an imaging device head sub-assembly for use with two imaging devices, such as cameras. As illustrated in FIGS. 3-4, each imaging device includes a lens mount 170, 172 secured to an imaging device board 160, 162, and the imaging device boards 160, 162 are secured to the imaging device mounting board 120. The imaging device(s) and the imaging device mounting board 120 are isolated inside of the imaging device housing 110 with a front plate 112 and a back plate 114 fastened to the imaging device housing 110 on each end. The front plate 112 has openings 116, 118 for the imaging devices inside the housing to view through and take pictures and/or videos outside of the imaging device housing 110. In particular, the openings 116, 118 are aligned with the lens mounts 170, 172. In the embodiment illustrated in FIG. 3, the lens mounts 170, 172 are secured to imaging device boards 160, 162, and the imaging device boards 160, 162 are secured to the imaging device mounting board 120 with screws. Although screws are shown to secure various components of the imaging device head sub-assembly together, other types of fasteners may also be utilized, as the present invention is not limited in this respect.

To isolate the imaging device mounting board 120 and imaging devices from the imaging device housing 110, a resilient material may be utilized as an interface between components. The resilient material acts as an energy absorbing or dampening material which helps to minimize any wear or damage on the components of the imaging device. The resilient material may also secure the imaging device within the housing 110. Under vibrations or shock loadings, the resilient material provides some cushion between the imaging device board and the imaging device housing. As some of the energy of a shock and/or vibration is absorbed into the resilient material, the effect of the shock and/or vibration is lessened on the components of the imaging device and the imaging device mounting assembly, thus minimizing the shock load.

In one embodiment, as illustrated in FIG. 3, a plurality of grommets 130 act as the resilient material. These grommets fit through openings formed in the imaging device mounting board 120 and may extend out through to one or both sides of the imaging device mounting board 120. Although the grommets in FIG. 3 are shown as having a circular cross-section, it should be appreciated that the grommets may also have other cross-sectional shapes, such as rectangular or C-shaped, for example. In one embodiment, one end of the grommet 130 presses against a mounting pad 150 positioned on the imaging device housing 110 to provide a cushioning interface between the imaging device housing 110 and the imaging device mounting board 120. As described in further detail below, a screw, washer, and spacer assembly 140 is inserted through the grommet 130 to secure the imaging device mounting board 120 to the imaging device housing 110. In this particular embodiment, shoulder screws are used through the grommets 130, and the spacer may be capable of a certain percentage of compression to further add resilient material to the mounting assembly. Other suitable mounting arrangements for the resilient material may be utilized, as the present invention is not limited in this respect. Further, although in this embodiment, the resilient material is mounted between the imaging device board and the housing, the present invention is not limited in this respect as other suitable locations for locating the resilient material may be employed.

Such grommets may be available from the Aearo Company of Indianapolis Ind., and more detailed information about the grommets may be found in data sheets from the Aearo Company, including "Molding Materials-Materials Summary Sheet", "Isodamp and Versadamp Grommets", and "Isolator Installation Hints", all of which are incorporated into U.S. Provisional Application No. 60/663,969. In one embodiment, the isolation grommet utilized in the assembly is #G410-V2590. As described in the above-mentioned supplemental material, this particular grommet is made from a TPR (thermoplastic rubber) having a hardness of 57 (Shore A Durometer 23C) at 5 seconds post impact and a hardness of 40 at 15 seconds post impact. It is appreciated that a variety of types of grommet configurations may be utilized, as the present invention is not limited in this respect.

Four grommets are shown in FIG. 3, each secured to a corner of the imaging device mounting board 120, however, other embodiments may feature any number of grommets in any suitable mounting location. For example, three mounting locations (forming a triangle) may be utilized. It is also noted that when the weight on the imaging device mounting board 120 is balanced, the grommets may be symmetrically positioned across the board 120, such as at corners or other edge positions. However, if the weight of the board 120 is asymmetric, then it may be desirable to also position the grommets asymmetrically to support the load.

Although only one mounting pad 150 is visible from FIG. 3, it is appreciated that there may be a plurality of mounting pads disposed within the housing 110, such that each grommet 130 is aligned with a mounting pad 150. Alternatively, one or more mounting pad 150 may extend along portions of the walls of the housing to press against more than one grommet 130.

It is also appreciated that the mounting pads 150 may be pieces formed separately from the housing, or they may be integrally formed with the housing 110, or they may be part of the walls of the housings itself.

Figure 3A:
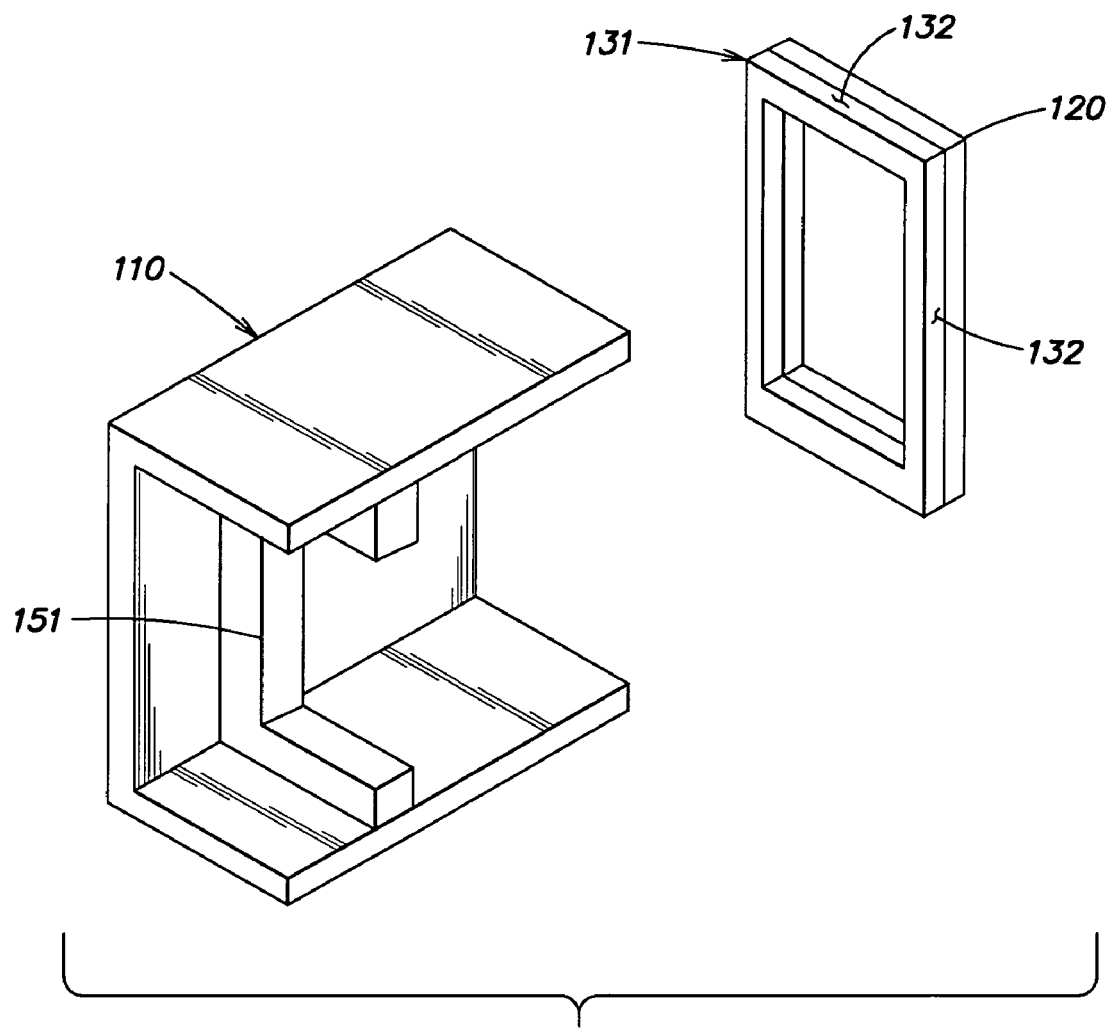
FIG. 3A is another embodiment of a portion of the imaging device head sub-assembly.

In another embodiment, illustrated in FIG. 3A, the resilient material may be in the form of a band 131 extending fully or only partially around the imaging device mounting board 120. In this embodiment, the band 131 follows the outer contour of the imaging device mounting board 120, and it aligns with portions of the imaging device housing 110, such as the mounting pad 151. The band 131 may be attached to the imaging device mounting board by any suitable means, such as by gluing or integrally molding, as the present invention is not limited in this respect. Similarly, the band 131 may be mounted to the housing via fasteners mounting the band 131 to mounting pads. Alternatively, the band 131 may be glued to the housing. Other suitable attachment arrangements may be employed, as the present invention is not limited in this respect. Although FIG. 3A illustrates a partially cut-out view of the imaging device housing 110 and mounting pad 151, the mounting pad 151 may be constructed with the same or similar shape as the resilient band 131. The resilient material may be made of a variety of materials, such as various vibration dampening materials, or types of rubber materials. The desired durometer of the resilient material depends upon the specific application.

In yet another embodiment, the resilient material may be formed into a band 131 of resilient material secured to the imaging device mounting board 120, where the resilient band 131 is secured directly to at least portions of the imaging device housing 110, without any type of mounting pad 151 protruding into the inside of the housing 110. In this embodiment, the band 131 may be secured to the housing 110 along an edge 132 of the band 131. Any number and type of fasteners may be used to secure the housing, band, and mounting board to each other, as the present invention is not limited in this respect.

FIG. 4 illustrates the full expanded assembly view of the imaging device head sub-assembly 100. Like FIG. 3, FIG. 4 also illustrates the placement of the imaging device mounted on the imaging device mounting board 120. As shown, in one embodiment, one imaging device is mounted to each side of the mounting board, with both lens mounts 170, 172 facing towards the front plate 112. In this embodiment, the lens mounts are relatively rigidly attached to the mounting board 120; however, the present invention is not limited in this respect and resilient mounts, such as grommets or stand-off resilient mounts, may be employed at the interface between the lens mounts 170, 172 and the mounting board 120 instead of, or in addition to, the resilient mounts between the mounting board 120 and the housing. Indeed, one or more resilient mounts may be employed at any suitable location provided that the relevant components are suitably protected to meet the relevant test standards, such as the noted MIL-S-901D (NAVY) specifications, including, but not limited to the Grade A MIL-S-901D (NAVY) Lightweight specification.

Various types of seals may be incorporated into the imaging device housing 110 to seal the imaging device head sub-assembly 100. These seals may be of particular importance in an embodiment where the imaging device mounting assembly is constructed to be submersible under water. In some embodiments, the seals are constructed and arranged such that the imaging device mounting assembly is capable of being submerged up to a depth of approximately 2 meters for up to 2 hours. In another embodiment, the imaging device mounting assembly is capable of being submerged up to a depth of approximately 2 meters for up to 78 hours. Seals such as o-rings, quad seals, or "T" seals, as well as other types of seals may be interchangeably used, as the present invention is not limited in this respect. In certain embodiments, a quad seal, which is similar to an o-ring but has a square-like cross-section, may provide a more effective seal when subjected to low pressures. It should be appreciated that although the description below of certain embodiments may state a specific type of seal, it is intended to be representative of one embodiment, as the present invention is not so limited. Furthermore, in one embodiment where the mounting assembly is designed to be sealed to withstand submersion under water, any connector that goes from the interior to the exterior of the mounting assembly may also include a seal around the connector.

FIG. 4 also illustrates the imaging device housing 110 secured to the front plate 112. Although not visible, it is appreciated that the above described one or more mounting pads 150, 151 may be located within the imaging device housing 110. A sun visor 180 is positioned around the opening in the front plate 112 to block light from directly shining onto the imaging devices inside of the housing 110. A seal, such as a quad seal 182 and a clear plate, such as a piece of glass 184 are positioned adjacent the openings 116, 118 in the front plate 112 to further seal the imaging device within the imaging device housing 110.

In one embodiment, an oblong heater 186 is positioned against a glass retainer 188, adjacent the inside portion of the glass 184. A heater 186 may be beneficial for adjusting the temperature of the environment inside of the imaging device housing 110. This may be particularly advantageous for use with a CCD camera, which may be sensitive to temperature variations. A plurality of fasteners, such as screws 141 are used to secure the glass retainer 188 to the front plate 112, with the seal 182, glass 184, and heater 186 positioned therebetween.

As described above, a plurality of screws 141 and spacers 142 are used to secure the imaging device boards 160, 162 to the imaging device mounting board 120. When there is more than one imaging device secured to the imaging device mounting board 120, a imaging device switching board 194 may be implemented. Behind the imaging devices in the housing 110, another seal, such as a quad seal 192 is positioned adjacent the back plate 114 to seal the back part of the housing 110. Further, as illustrated in FIG. 4 and as described in more detail below, the imaging device head sub-assembly includes a tap pad 190 for securing the imaging device head sub-assembly 100 to the cantilever arm sub-assembly 200 to vary the tilt of the imaging device assembly.

Figure 5:
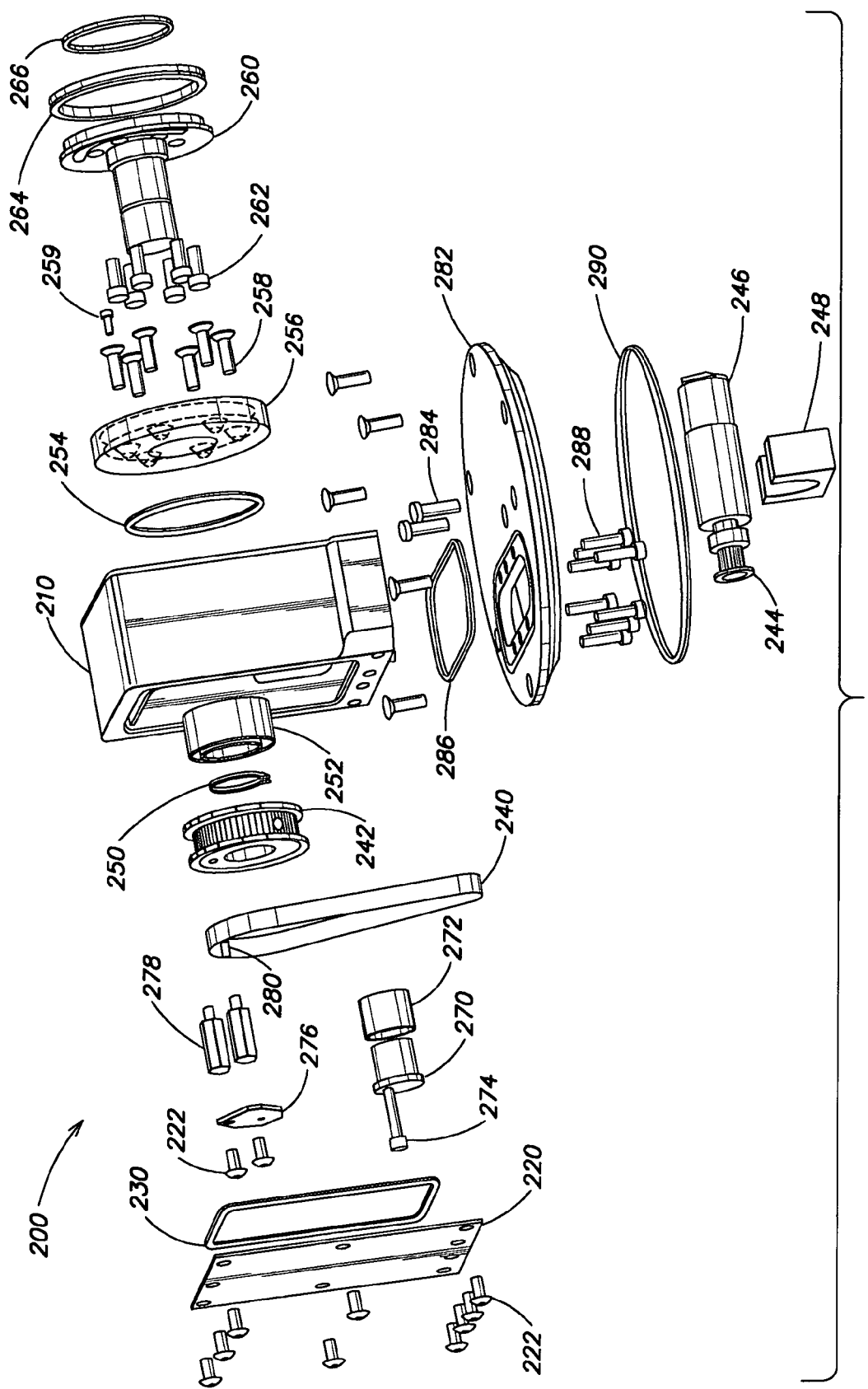
FIG. 5 is an exploded assembly view of the cantilever arm sub-assembly.

Turning now to FIG. 5, the cantilever arm sub-assembly 200 is shown in further detail. The cantilever arm sub-assembly 200 interlocks with the tap pad 190 on the imaging device head sub-assembly 100 to vary the tilt angle of the imaging device. Most of the components in the cantilever arm sub-assembly 200 are housed within the cantilever arm 210, which is shown as a rectangular structure covered at one end with the arm seal plate 220. The arm seal plate 220 is secured to the cantilever arm 210 with a plurality of fasteners, such as screws 222, and a seal, such as a quad seal 230 is further provided adjacent the arm seal plate 220. Inside the cantilever arm 210, a timing belt 240 wraps around the first timing belt gear 242 at one end, and around a second timing belt gear 244 at its other end. As shown, the second timing belt gear 244 is driven by the motor and gearbox 246 which is secured to the tilt motor mount 248. In this particular embodiment, the first timing belt gear 242 has 50 teeth, while the second timing belt gear 244 has 12 teeth, providing a gear ratio of approximately 4.2. However, in other embodiments, the gear ratio may vary based upon the particular application, as the present invention is not limited in this respect. Adjacent the first timing belt gear 242 is a retainer ring 250 and a tilt bearing 252, which align with a seal, such as a quad seal 254, and the outer seal 256 is secured to the cantilever arm 210 with fasteners 258, 259. A hub 260 aligns with the first timing belt gear 242 for rotation therewith. A plurality of fasteners 262 extend through the hub 260 to interface with openings featured in the tap pad 190 (see FIG. 4) to position and connect the cantilever arm sub-assembly 200 with the above described imaging device head sub-assembly 100. The outer portion of the hub 260 is provided with additional seals, such as a quad seal 266 and a spring loaded Teflon seal 264 to protect the motorized and moving components inside of the cantilever arm 210. Other components inside of the cantilever arm include a device, such as cam 270, to act on the tilt belt so that the tilt belt remains under suitable tension. The tilt belt tensioner cam 270 may be secured within a sleeve bearing 272 with a fastener 274. A tilt proximity board 276 may also be employed, as well as a spacer such as a hex standoff 278, and a magnet 280. The tilt proximity board may include suitable electrical components to cooperate with the magnet 280 to aid in homing the pan/tilt features. Furthermore, in one embodiment, the various fasteners 258, 259, 262 and 274 may include socket head cap screws and/or button head cap screws.

As illustrated in FIG. 5, the cantilever arm 210 is secured to a rotating top plate 282 with fasteners 288. Another seal, such as a quad seal 286, is provided to further seal the opening in the rotating top plate 282 where the timing belt 240 extends through. Further, to seal the top rotating plate 282 with the motor and gearbox 246 therein, a seal, such as o-ring 290, is provided.

Figure 6:
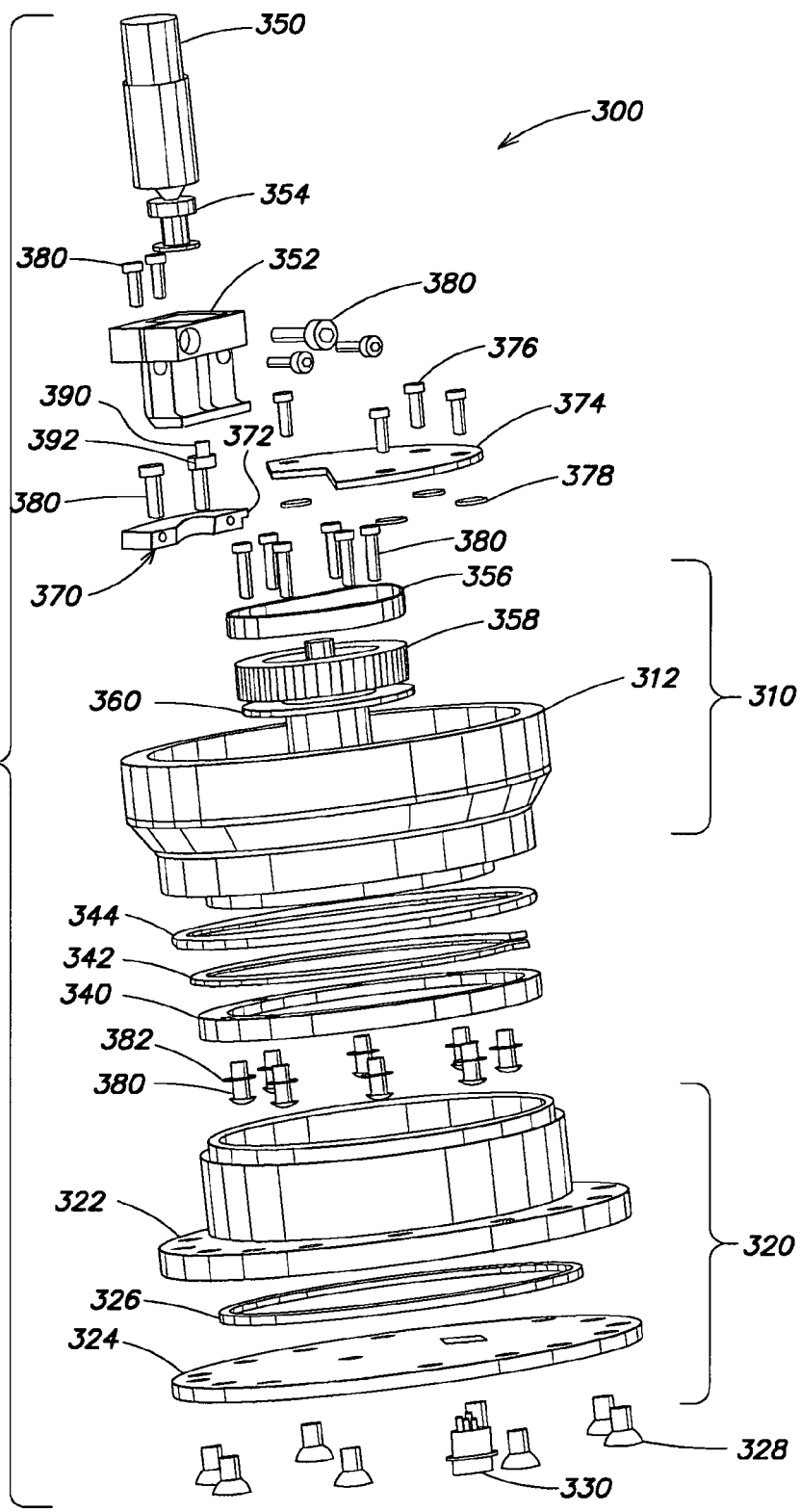
FIG. 6 is an exploded assembly view of the base sub-assembly.

Turning now to FIG. 6, the base sub-assembly 300 is shown in further detail. As discussed above, the base sub-assembly 300 includes a rotating portion 310 including a moving base 312 which rotates with the cantilever arm and imaging device head sub-assemblies 200, 100 to be able to pan an imaging device. To secure or position the assembly adjacent to a supporting structure (not shown), the base sub-assembly also has a stationary portion 320 which includes a non-movable base 322 connected to a bottom base 324 with fasteners 328, and a seal, such as an o-ring 326, is positioned therebetween to seal the inside of the base sub-assembly 300. An opening may be provided in the bottom base 324 to insert a pin hirose electrical connector 330. To facilitate the movement of the moving base 312 relative to the non-movable base 322, a thin bearing 340, such as a JA REALI-SLIM bearing available from Kaydon Corporation located in Ann Arbor, Mich., and a light duty retaining ring 342 may be positioned between the two components. Further, to seal the inside of the base, a seal, such as a spring loaded Teflon seal 344, may also be positioned between the moving base 312 and the non-movable base 322.

To automate movement of the rotatable portion 310 of the base to pan the imaging device, a motor and gearbox 350 is secured within the pan motor mount 352. A dowel pin 390 and snap in bearing 392 connect the pan motor mount 352 to a pan base adjustable mount 370. A third timing belt gear 354 (the first and second timing belt gear are described above with reference to the cantilever arm sub-assembly 200) is secured for rotation with the motor and a fourth timing belt gear 358 is secured for rotation with the moving base 312 with the pin slip ring 360. A timing belt 356 wraps around both the third and the fourth timing belt gears 354, 358. In this particular embodiment, the third timing belt gear 354 has 12 teeth and the fourth timing belt gear 358 has 72 teeth, providing a gear ratio of 6. However, it is appreciated that in other embodiments, the gear ratio may vary based upon the particular application, as the present invention is not limited in this respect. Other components inside of the base sub-assembly 300 include a magnet 372 for assisting with homing the pan/tilt features, and a control board 374. In this particular embodiment, fasteners, such as screws 376 and washers 378 are used to secure the control board 374. It should be appreciated that various fasteners 380 and washers 382 are used throughout the base sub-assembly to secure components together.

Figure 7:
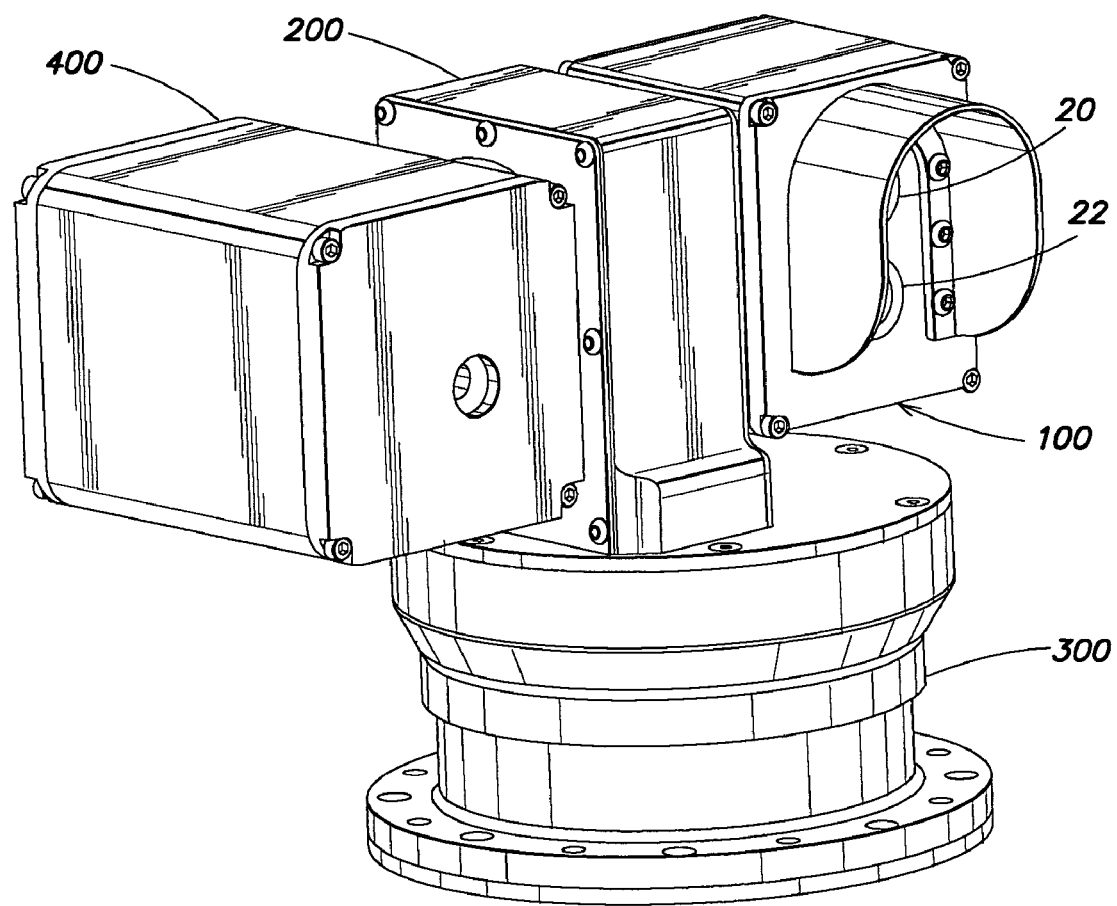
FIG. 7 is an assembled view of the pan and tilt imaging device mounting assembly according to one embodiment having night vision capabilities.

As discussed above, the present invention imaging device mounting assembly may be used with a variety of different types and numbers of imaging devices, as the present invention is not limited in this respect. For example, the imaging device may include various types of cameras and/or video recording devices. FIG. 7 illustrates one embodiment where the mounting assembly includes a night vision camera sub-assembly 400. Similar to the imaging device head sub-assembly 100, the night vision camera sub-assembly 400 may rotatably connect to the cantilever arm sub-assembly 200 to vary the tilt of the night vision camera and also to be able to pan the night vision camera about the base sub-assembly 300. In one embodiment, the night vision camera sub-assembly 400 utilizes an infrared camera. When the night vision camera sub-assembly 400 is attached to the whole assembly, the cameras 20, 22 mounted within the imaging device head sub-assembly 100 may include both a wide angle camera and a telephoto camera. It should be appreciated that the night vision camera sub-assembly 400 may include the above-described resilient material interfaced between the night vision camera housing and the night vision camera and/or night vision camera mounting boards to help protect the night vision camera from damage that could occur when subjected to shocks or vibrations. Examples of these and/or other cameras may be found in commonly assigned U.S. Pat. No. 6,744,467, and in pending U.S. patent application Ser. Nos. 10/798,841 and 10/809,793, each of which is hereby incorporated by reference in its entirety.

As mentioned above, the present invention includes an imaging device mounting assembly which meets certain military specifications. In particular, according to certain embodiments of the present invention, mounting assemblies are provided which meet the military specification Mil-S-901D (Navy). A copy of this particular specification is included in U.S. Provisional Application No. 60/663,969, which is incorporated by reference in its entirety. These specifications describe the detailed requirements for shock tests for ship board machinery.

EXAMPLE

As illustrated in the Laboratory Services Shock Test Data illustrated in FIGS. 10A-C, three different imaging devices constructed in accordance with the present invention met the MIL-S-901D (NAVY) Lightweight specification. In this particular test, although the imaging devices were different from each other and may be different in some respects from the particular embodiments described above, each imaging device included a resilient material interfaced at a suitable location between the imaging device (or imaging device mounting board) and the outer housing, with the resilient material arranged in a manner that absorbs or dampens a shock or vibration to minimize any resulting damage to the imaging device, as taught by the present invention. In particular, the first imaging device is a Pan and Tilt External Digital Camera, manufactured by Vision Technologies as Model Number PT2006 P/T (see FIG. 10A for Test Data), the second imaging device is a Variable Aperture Internal Wide Angle Box Digital Camera, manufactured by Vision Technologies as Model Number BX4004-404 (see FIG. 10B for Test Data), and the third imaging device is Variable Aperture Internal Box Digital Camera, manufactured by Vision Technologies as Model Number BX4004-10x04 (see FIG. 10C for Test Data).

In this test, each imaging device assembly was subjected to nine shock blows in accordance with the test standard. In particular, each imaging device assembly was subjected to drops of 1 foot, 3 feet, and 5 feet. This series of drops is first conducted along a first axis, with a top surface of each imaging device being designated as the impact plane. This series of three drops is then repeated along a second axis, with a side surface of each imaging device being designated as the impact plane. The final series of three drops is conducted along a third axis, with a back surface of each imaging device being designated as the impact plane.

After each blow, the assembly was reviewed for any signs of material deformation or operational degradation. As indicated in the test data shown in FIGS. 10A-10C, the imaging device assemblies were able to complete this series of tests without any signs of deformation or degradation. Notably, after each blow, the imaging devices' functionality was retained. It is believed that the tested imaging device assemblies were the first imaging device assemblies adapted to meet the Grade A MIL-S-901D (NAVY) Lightweight specification. Therefore, its is believed that imaging devices assemblies constructed in accordance with aspects of the present invention (and in accordance with at least some of the embodiments described herein) will be capable of meeting the MIL-S-901D (NAVY) Lightweight specification. Further, it is believed that that imaging device assemblies constructed in accordance with aspects of the present invention (and in accordance with at least some of the embodiments described herein) will be capable of meeting other suitable standards, such, but not limited to the MIL-S-901D (NAVY) Medium weight specification and the MIL-S-901D (NAVY) Heavyweight specification. As mentioned above, the invention also contemplates other standards described in MIL-S-901D (NAVY), such as Grade B, Class II and III, and Type B and C.

The present invention may be manufactured from a variety of types of materials. An exemplary list of the type of materials for the housing, end plates, mounting pads, spacers, and imaging device mounting boards include: steel, aluminum, titanium, a rigid plastic, etc. It may be advantageous to make the above components from aluminum for the beneficial characteristics of aluminum being lightweight, strong, and corrosive resistant. In one embodiment, the wall thickness of the imaging device housing is approximately between 1/8 inch-3/16 inch. In one embodiment, grade 6061-T6 aluminum alloy is used to make some of the above listed components. In another embodiment, ballistic steel is used to make some of the above listed components.

As discussed above, in one embodiment, a rugged assembly for mounting an imaging device is provided, where the mounting assembly is constructed of robust materials of sufficient size and structure to withstand various impacts. In these embodiments, the mounting assembly may additionally include energy absorbing materials to help to withstand impacts. However, the present invention is not limited in this respect, as energy absorbing materials need not be employed. For example, an imaging device mounting assembly may be constructed similar to the one described above with respect to FIGS. 1-4, except that instead of using resilient material, such as grommets, the mounting assembly is constructed of larger, thicker, and/or more structurally stable materials. Accordingly, these robust materials are used to secure an imaging device within the outer housing of the imaging device mounting assembly such that the assembly is able to withstand shock and/or vibration in accordance with MIL-S-901D (NAVY). In particular, in one embodiment, the rugged assembly may be constructed to meet MIL-S-901D (NAVY) for the Lightweight category, Grade A, Class I, Type A, for a Hull Mounting. It should be appreciated that in one embodiment, a robust assembly utilizing robust materials for mounting an imaging device may be provided using components made of certain types of aluminum or ballistic steel. Also, the size and thickness of the components used to make this robust mounting assembly will vary based upon the maximum shock loading. The exact dimensions of certain components would depend upon factors such as the overall weight of the imaging device and the expected shock and vibration.

Furthermore, in one embodiment, the sub-assemblies used to perform the panning and/or tilting capabilities are made from robust materials. In one embodiment, the materials selected for use in these sub-assemblies, such as the cantilever arm sub-assembly and the base sub-assembly are able to withstand various impacts without the use of resilient materials to help dampen the load. However, it should be appreciated that in some embodiments, resilient materials may also be incorporated into the cantilever arm sub-assembly and/or the base assembly.

Figure 9:
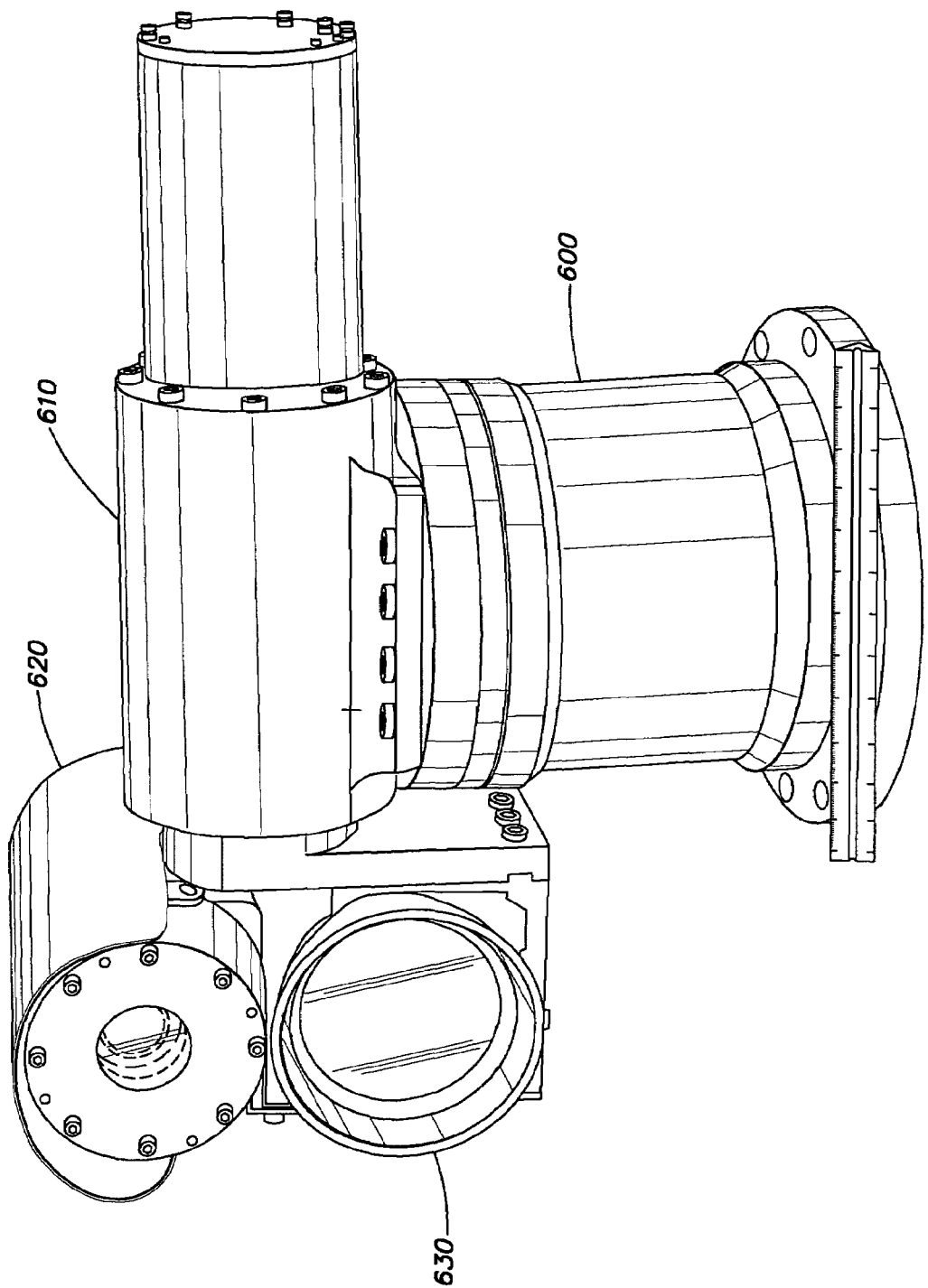
FIG. 9 is a perspective view of the imaging device mounting assembly according to another embodiment.

According to certain embodiments of the present invention, the above-described imaging device mounting assembly may be used with a variety of types of imaging devices, as the present invention is not limited in this respect. For example, another embodiment of an imaging device mounting assembly is illustrated in FIG. 9. This embodiment includes a base sub-assembly 600 and a cantilever arm sub-assembly 610 which function similar to the above-described base sub-assemblies and cantilever arm sub-assemblies to vary the tilt of the accompanying imaging devices and also to pan the imaging devices about portions of the base sub-assembly. In this particular embodiment, two imaging devices 620, 630 are secured to one end of the cantilever arm sub-assembly 610 and they are arranged in a stacked configuration, with one imaging device 620 above the other imaging device 630. In this embodiment, the mounting assembly may be constructed of robust materials, including aluminum, such that the total assembly weighs approximately 200 pounds. However, it should be appreciated that in other embodiments, the weight of the assembly varies. For example, in some embodiments, the mounting assembly may be lighter and for use with smaller imaging devices, such as imaging devices and/or the combination of the imaging device and the mounting assembly does not exceed approximately 1 pound. In another embodiment, the mounting assembly does not exceed 5 pounds. In yet another embodiment, the mounting assembly does not exceed 10 pounds. In still another embodiment, the mounting assembly does not exceed 50 pounds. In another embodiment, the mounting assembly does not exceed 100 pounds.

In one embodiment, the temperature and moisture content around the imaging device may be controlled. This may be desirable to prevent ice and/or condensation from forming on portions of the imaging device, such as on glass components, such as any windows. To control the temperature, a heater may be provided with the imaging device to keep the internal temperature above a certain temperature, such as above approximately −40° C. In one embodiment, the desired temperature range is between approximately −40° C. and approximately +60° C. It may be desirable to adjust the temperature to prevent frost or freezing of any glass components. A thermistor may also be used to control the environment. The imaging device mounting assembly may also be dry nitrogen charged to keep moisture out of the imaging device housing, and to prevent corrosion of the components. In one embodiment, there is a positive charge, and the pressure is approximately 2 psi above atmospheric pressure. In another embodiment, the pressure ranges from approximately 2-4 psi above atmospheric pressure, and in another embodiment, the pressure is approximately atmospheric pressure. In another embodiment, a desiccant material, such as a calcium oxide or a silica gel may also be employed at suitable locations to act as a drying agent to reduce the moisture content inside of the housing.

In one embodiment, portions of the imaging device mounting assembly may include RFI (radio frequency interference) shielding. For example, portions of the imaging device mounting assembly, such as the glass and aluminum parts, may be coated with a material such as ITO (indium tin oxide). This shielding allows the imaging device to work with other devices without causing and/or being influenced by undesirable radio interference.

In one embodiment, the above-described imaging device mounting assembly is mounted to a portable and remotely deployable wireless imaging system. This wireless system may be contained in a housing to provide a user in a remote location with real time imaging from the imaging device. The wireless imaging system may be battery operated, or alternatively, may be powered by hydrogen powered cell technology, which may be obtained, for example, from Jadoo Power Systems, located in Folsom, Calif. In one particular embodiment, the wireless imaging system may be powered with fuel cells for five days of continuous use without recharging.

In another embodiment, the above-described portable wireless imaging system may be used without the above-described shock-resistant imaging device mounting assembly, but rather with other various types of imaging devices and/or other sensing devices, to allow the user to remotely ascertain real time imaging. An example of the types of imaging devices that may be employed with the wireless imaging system include heat sensitive cameras, cameras with night vision and/or day vision capabilities, and cameras with wide angle and/or telephoto lenses, and can include any of the imaging devices disclosed or referred to herein. An example of some of the types of sensors that may be employed with the wireless or modular imaging system include either visual or software motion detectors, audio diction, vibration sensors, software tracking, and object recognition software. However, it is appreciated that other types of imaging devices and sensing devices may also be employed with this modular imaging system, as the present invention is not limited in this respect.

There are a variety of ways in which the wireless imaging system may transmit data from the imaging device and/or other sensing data to a desired remote location. An exemplary list includes via satellite, radio, microwave, or infrared technology, however, the present invention is not limited to a particular type of data transmission. In one embodiment, communication signals from the imaging system to a base station may be encrypted.

In one embodiment, this wireless system may be a field deployable pod, which is desirable in various types of military applications. For example, an imaging device with this wireless imaging system may be deployed from an airplane into a hostile environment. The wireless technology enables real time surveillance without unnecessarily endangering the lives of humans having to operate the imaging device within the hostile environment. With the addition of the above-described imaging device mounting assembly, the wireless imaging and imaging device system could be deployed from the air without damaging or breaking the components.

Figure 8:
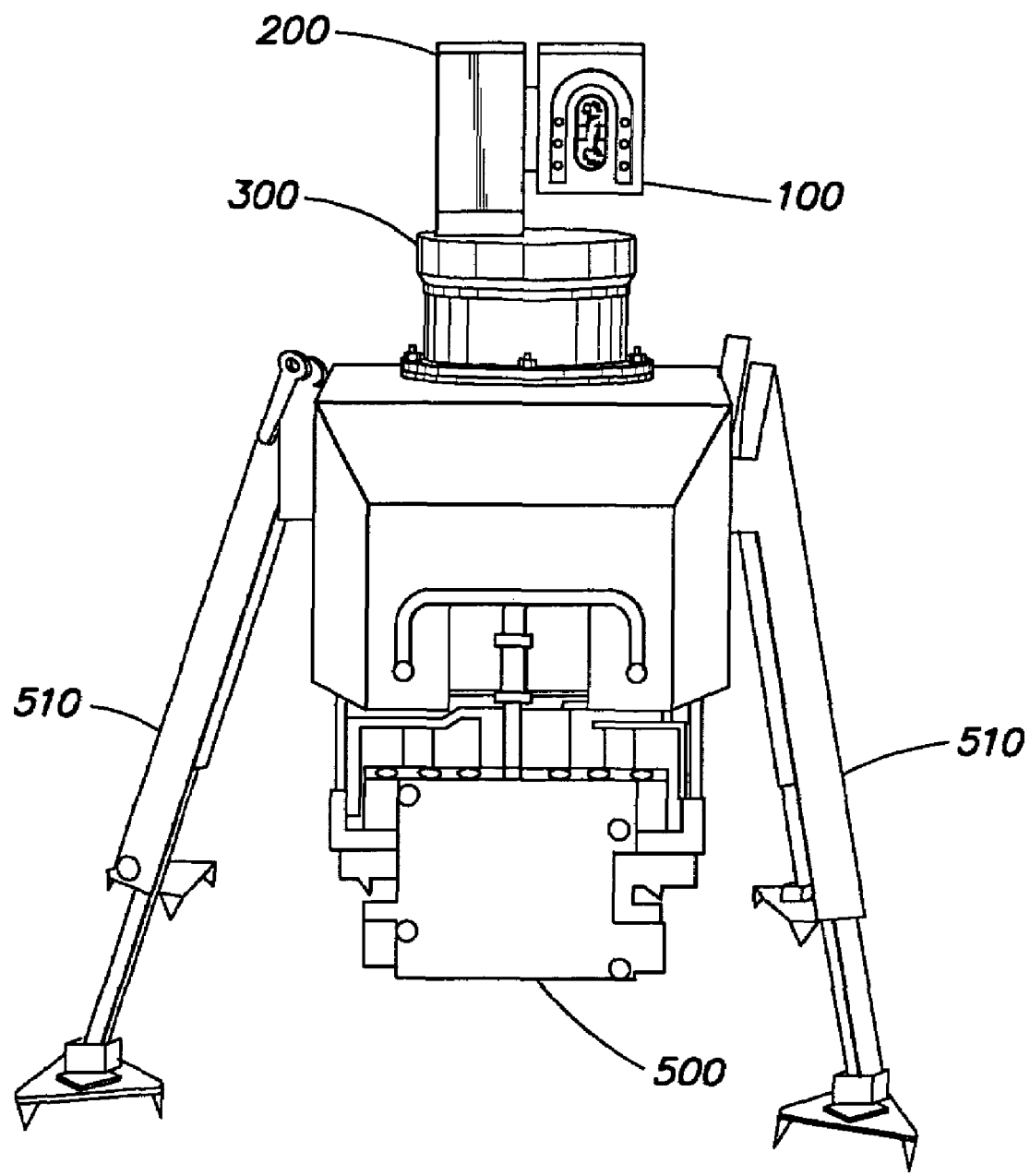
FIG. 8 is a perspective view of one embodiment featuring a wireless imaging system.

FIG. 8 illustrates one embodiment of a field deployable pod featuring the wireless imaging system. This particular imaging device assembly has both panning and tilting capabilities, with the imaging device head sub-assembly 100 secured to the cantilever arm sub-assembly 200 and the base sub-assembly 300, in a similar manner as discussed above. However, it is appreciated that in other embodiments, the wireless imaging system may be utilized with imaging devices having only panning mechanisms, only tilting mechanisms, or neither mechanism.

Continuing with reference to FIG. 8, a portable imaging sub-assembly 500 positioned below the base sub-assembly 300 holds the wireless imaging system, and a plurality of legs 510 may be used to provide greater stability to the system. In one embodiment, the legs 510 are telescoping, and/or are retractable, and/or foldable for positioning and transporting the assembly.

In one embodiment, the imaging device head sub-assembly 100 is removably mounted to the portable imaging sub-assembly 500. This enables a user to easily swap the type of imaging device being used with the portable imaging sub-assembly 500. For example, one imaging device head sub-assembly may have a wide angle lens and a telephoto lens. This sub-assembly may easily be swapped with another imaging device sub-assembly having both day vision and night vision (infrared) capabilities. It is appreciated that other types of imaging device and sensing devices may be removably mounted to the portable imaging sub-assembly, as the present invention is not limited in this respect.

In one embodiment, the wireless imaging system is a modular imaging system including a housing having a power source and control circuit, where the control circuit is adapted to control an imaging device. The imaging system further includes an imaging device mounting assembly containing the imaging device, where the imaging device is adapted to acquire data from a detection area and the mounting assembly is removably coupleable to the housing to be in power and data communication with the control circuit. As discussed above, the power source may, for example, be a self-contained device, such as a battery, or a fuel cell. Once the control circuit obtains the data from the imaging device, the data may be transmitted to a remote location via satellite, radio, microwave, or infrared technology.

The wireless imaging system may further include an audio signal detector adapted to acquire audio signals from the detection area. In one embodiment, the imaging system may be adapted to change from a standby mode to an active mode in response to detection of an audio signal by the audio signal detector.

In another embodiment, the wireless imaging system may further include a vibration sensor adapted to detect vibrations within the detection area. In this embodiment, the imaging system may be adapted to change from standby mode to an active mode in response to the detection of a vibration detected by the vibration sensor.

In one embodiment, the wireless imaging system further includes a signal transmission module removably coupleable to the housing to be in power and data communication with the control circuit, and adapted to transmit signals from the control circuit to a remote location. In various embodiments, the signal transmission module may include an 80211B antenna, a microwave antenna, or a satellite antenna. In one embodiment, the control circuit is adapted to encrypt signals to be transmitted by the signal transmission module.

The wireless imaging system may further include a reconfigurable mount adapted to support the housing on varied mounting surfaces. In one embodiment, the reconfigurable mount includes a plurality of legs adapted to extend from the housing to accommodate varied mounting surfaces. As discussed above, the legs may retract or telescope to conform to a mounting surface.

In one embodiment, the power source may include a fuel cell power source having a rechargeable hydrogen fuel container. This container may be chargeable with fuel to operate the detection system for up to five days. In one embodiment, the container is removable from the housing.

In one embodiment, the imaging device mounting assembly is hermetically sealed. In one embodiment, the mounting assembly is adapted to operate in temperatures between approximately minus 40 Fahrenheit and approximately 150 Fahrenheit. As discussed above, in one embodiment, the imaging device mounting assembly features a resilient material to assist in making the system shock-resistant. In one particular configuration, the combination of the imaging device and the mounting assembly weighs less than approximately 10 pounds.

In one embodiment, the wireless imaging system includes a plurality of imaging device mounting assemblies, each containing one or more imaging devices adapted to acquire data from a detection area, where each of the mounting assemblies are interchangeably coupleable to the housing to be in power and data communication with the housing. This system may further comprise a control circuit adapted to control the imaging device. In this system, at least one of the plurality of mounting assemblies includes a motor to directionally position the imaging device with the detection area.

In some embodiments, it may be advantageous for an imaging device, such as a camera with a wireless imaging system, to blend into a surrounding environment and be undetectable. In such a case, noiseless stepper motors may be used to power the system. Additionally camouflage layers, such as a painted layer, or a Ghillie Suit, may be placed on top of the system to blend into the background.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An imaging device mounting assembly for mounting an imaging device, the assembly comprising:
   an imaging device mounting board adapted to secure the imaging device thereto;
   a first resilient member adapted to be interfaced between the imaging device and the imaging device mounting board;
   an outer housing enclosing the imaging device mounting board, wherein the imaging device mounting board is secured to the outer housing; and
   a second resilient member interfaced between the outer housing and at least one of the imaging device and the mounting board;
   wherein the first and second resilient members are arranged with respect to the outer housing and the imaging device mounting board in a manner that is adapted to at least partially dampen movement of the imaging device to minimize damage to the imaging device that would otherwise render the imaging device inoperable for its intended function upon impact from an external shock load.

2. The imaging device mounting assembly of claim 1, further comprising:
   a cantilever arm sub-assembly rotatably connected to the outer housing, wherein the cantilever arm sub-assembly is constructed and arranged to provide tilting capabilities.

3. The imaging device mounting assembly of claim 2, wherein the cantilever arm sub-assembly is adapted to tilt the imaging device approximately 115°.

4. The imaging device mounting assembly of claim 2, wherein the cantilever arm sub-assembly is adapted to tilt the imaging device between −360° and 360°.

5. The imaging device mounting assembly of claim 2, wherein the cantilever arm sub-assembly is adapted to tilt the imaging device continuously.

6. The imaging device mounting assembly of claim 1, further comprising:
   a base sub-assembly operatively connected to the outer housing, wherein the base sub-assembly is constructed and arranged to provide panning capabilities.

7. The imaging device mounting assembly of claim 6, wherein the base sub-assembly is adapted to pan the imaging device between −360° and 360°.

8. The imaging device mounting assembly of claim 6, wherein the base sub-assembly is adapted to pan the imaging device continuously.

9. The imaging device mounting assembly of claim 6, further comprising:
   a cantilever arm sub-assembly rotatably connected to the outer housing, wherein the cantilever arm sub-assembly is positioned between the base sub-assembly and the outer housing to operatively connect the base sub-assembly to the outer housing, wherein the cantilever arm sub-assembly and the base sub-assembly are constructed and arranged to provide the imaging device with both panning and tilting capabilities.

10. The imaging device mounting assembly of claim 1, further comprising at least one seal operatively disposed relative to the outer housing to seal the imaging device within the outer housing.

11. The imaging device mounting assembly of claim 10, wherein the at least one seal seals the housing to be water resistant, such that the imaging device mounting assembly is submersible under up to 2 meters of water for a duration of time between at least 2 hours and up to 78 hours, without affecting the functionality of the imaging device within the outer housing.

12. The imaging device mounting assembly of claim 10, wherein the at least one seal comprises a plurality of quad seals.

13. The imaging device mounting assembly of claim 1, further comprising a heater to control the temperature of the imaging device.

14. The imaging device mounting assembly of claim 13, wherein the heater is adapted to control the temperature of the imaging device between approximately −40° C. and approximately +60° C.

15. The imaging device mounting assembly of claim 1, further comprising an RFI shield.

16. The imaging device mounting assembly of claim 1, wherein at least a portion of the imaging device mounting assembly is dry nitrogen charged.

17. The imaging device mounting assembly of claim 1, combination with at least one imaging device.

18. The combination of claim 17, wherein the at least one imaging device includes a night vision camera.

19. The combination of claim 17, wherein the at least one imaging device includes a day vision camera.

20. The combination of claim 17, wherein the at least one imaging device includes a wide angle camera.

21. The combination of claim 20, wherein the at least one imaging device includes a telephoto camera.

22. The combination of claim 21, wherein the wide angle camera and the telephoto camera are sighted together.

23. The combination of claim 22, wherein the wide angle camera and the telephoto camera are mounted on a pan and tilt mechanism operatively connected with the imagine device mounting assembly.

24. The combination of claim 17, wherein the combination weighs less than 10 pounds.

25. The combination of claim 17, further comprising:
a portable imaging sub-assembly mounted to the imaging device mounting assembly, the portable imaging sub-assembly is adapted to be deployable into a remote location, the portable imaging sub-assembly being adapted to transmit data received from the imaging device at the remote location to a second location.

26. The imaging device mounting assembly of claim 1, wherein the outer housing comprises a wall having a thickness of approximately between 1/8 inch-3/16 inch.

* * * * *